US006538236B1

United States Patent
Rostan

(10) Patent No.: US 6,538,236 B1
(45) Date of Patent: Mar. 25, 2003

(54) LUMINOUS CIGAR LIGHTERS

(75) Inventor: Philippe Rostan, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 09/723,100

(22) Filed: Nov. 27, 2000

(30) Foreign Application Priority Data

Nov. 30, 1999 (FR) ............................................ 99 15069

(51) Int. Cl.[7] .............................. B60N 3/14; F23Q 7/00
(52) U.S. Cl. ......................... 219/267; 219/269; 362/30; 362/551
(58) Field of Search ................................. 219/267, 269, 219/265, 220; 362/30, 488, 489, 551, 511

(56) References Cited

U.S. PATENT DOCUMENTS

| 2,701,297 A | * | 2/1955 | Thibault ...................... 219/267 |
| 3,903,408 A | | 9/1975 | Seibel et al. |
| 4,079,242 A | * | 3/1978 | Seibel .......................... 362/32 |
| 4,713,733 A | * | 12/1987 | Fitz et al. ..................... 362/80 |
| 5,030,811 A | | 7/1991 | von Gaisberg et al. |
| 5,093,554 A | * | 3/1992 | Gaisberg et al. ............. 219/267 |
| 5,826,967 A | * | 10/1998 | Mathieu ...................... 362/92 |
| 5,900,172 A | * | 5/1999 | Thivet ........................ 219/267 |
| 5,928,539 A | | 7/1999 | Thivet |

FOREIGN PATENT DOCUMENTS

| DE | 3536187 | * | 4/1986 |
| EP | 434519 | * | 6/1991 |
| EP | 448501 | * | 9/1991 |
| EP | 511 089 | | 10/1992 |
| EP | 678 419 | | 10/1995 |
| FR | 2 235 022 | | 1/1975 |
| FR | 2436939 | * | 5/1980 |
| FR | 2630057 | | 10/1989 |
| FR | 2 758 111 | | 7/1998 |
| GB | 2029559 | * | 3/1980 |
| GB | 2 099 122 | | 12/1982 |

* cited by examiner

Primary Examiner—John A. Jeffery
(74) Attorney, Agent, or Firm—Morgan & Finnegan, LLP

(57) ABSTRACT

A motor vehicle cigar lighter of the luminous type comprises a lighter body which is a receptacle for a luminous and removable heating plug which consists of a fixed part and a moving part. The moving part is displaceable axially in the fixed part. The moving part includes a push button and a light guide for propagating light received by it from an external light source when the plug is in position in the body. The light guide is an element of the fixed part of the heating plug, and surrounds the push button.

24 Claims, 4 Drawing Sheets

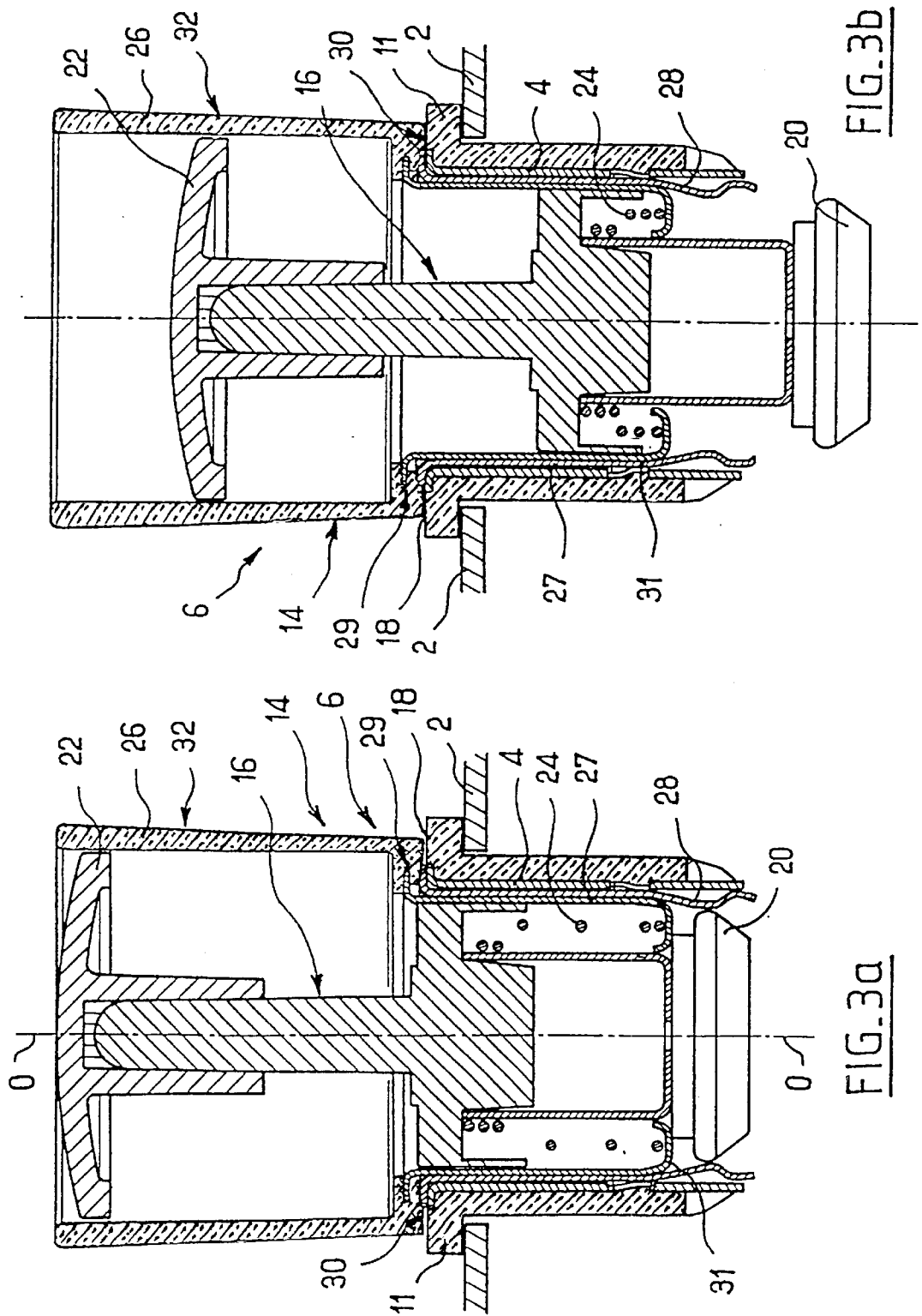

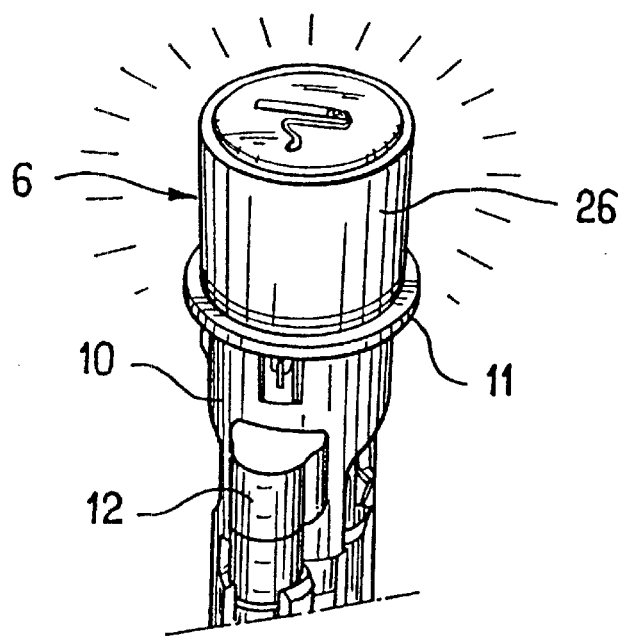
FIG_4
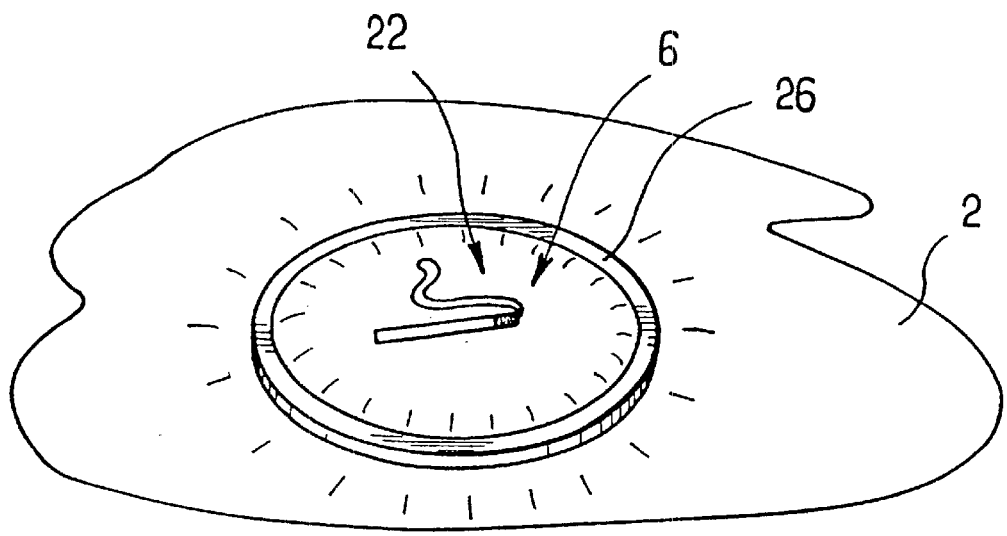
FIG_5

LUMINOUS CIGAR LIGHTERS

FIELD OF THE INVENTION

This invention relates to cigar lighters, especially those for motor vehicles, and more precisely luminous cigar lighters, that is to say those which can emit light in the dark.

BACKGROUND OF THE INVENTION

One cigar lighter of the above type is described for example in U.S. Pat. No. 5,928,539. It comprises a lighter body which constitutes a receptacle for a removable heating plug. The receptacle has an aperture through which the plug is introduced, and this aperture is surrounded by an illuminating ring which gives out light in the dark, when the appropriate electrical circuit is completed.

Cigar lighters are also known which have a lighter body and removable heating plug which are themselves luminous. The plug has a surface on which the user presses so as to push the plug into its heating position in the lighter body, and on which a symbol, which for example represents a lighted cigarette, is lit up by a diode located within the heating plug and supplied with power through the lighter body when the plug is in position in the latter.

Other types of cigar lighter have been proposed in which the heating plug is luminous but the construction of which is more simple and less expensive than that of the foregoing cigar lighters. For example, it is known from French patent specification No. FR 2 630 057 to provide a luminous cigar lighter, especially for motor vehicles, comprising a lighter body constituting a receptacle for a luminous and removable heating plug, the said plug comprising a fixed part and a moving part which is displaceable axially with respect to, and inside, the said fixed part, the moving part of the plug including a push button, the plug further including a light guide for propagating the light transmitted to it from a light source external to the heating plug when the heating plug is in position in the lighter body.

Because the light source inside the heating plug is eliminated, the construction of a cigar lighter according to this invention is simplified, and by the same token its manufacturing cost is reduced. On the other hand, such a cigar lighter does not give the same illumination of the heating plug, according to whether the latter is in its rest (or standby) position or in its heating position.

DISCUSSION OF THE INVENTION

An object of the present invention is to overcome the above mentioned drawback.

According to the invention, a luminous cigar lighter, especially for motor vehicles, comprising a lighter body constituting a receptacle for a luminous and removable heating plug, the said plug comprising a fixed part and a moving part which is displaceable axially with respect to, and inside, the said fixed part, the moving part of the plug including a push button, the plug further including a light guide for propagating the light transmitted to it from a light source external to the heating plug when the heating plug is in position in the lighter body, is characterised in that the said light guide is an element of the said fixed part of the heating plug that surrounds the push button.

The light is preferably colored by the light guide. Preferably, the light guide is at least partially flush with a gripping surface of the heating plug. The said gripping surface corresponds to that on which the user puts his fingers in order to grip the heating plug to draw it out of the lighter body. Thus, when the light guide is flush with the said surface, it shows the user where to put his fingers.

The heating plug preferably comprises a tube of translucent plastics material. This tube preferably constitutes an external sleeve around a push button, with the external surface of this tube corresponding to at least part of the gripping surface.

According to another preferred feature of the invention, the lighter body is mounted on a fascia panel and comprises an illuminating sleeve visible on the fascia panel and surrounding the aperture through which the heating plug is introduced into the lighter body, so as to mark the position of the cigar lighter and transmit light to the heating plug when the latter is in the lighter body. Thus, the cigar lighter is located in the vehicle by means of the illuminating sleeve when the heating plug is not in its receptacle, and by the heating plug when it is.

According to a further preferred feature of the invention, the illuminating sleeve and light guide each having at least one lighting zone, at least one lighting zone of the said sleeve is colored differently from at least one lighting zone of the said guide, so that the cigar lighter emits differently colored light when the heating plug is in position in the lighter body and when it is not in position therein.

Preferably, the light source consists of light guides or diodes or light bulbs.

Further features and advantages of the invention will appear more clearly on a reading of the following detailed description of some preferred embodiments of the invention, which are given by way of non-limiting example only and with reference to the accompanying drawings.

BRIEF DESCRIPTION OF THE DRAWINGS

FIG. 3a is a simplified cross sectional view of a cigar lighter of the same type as that shown in FIGS. 1 and 2, in its rest or standby mode.

FIG. 3b is the same is FIG. 3a, but shows the cigar lighter in heating mode.

FIG. 4 is an isometric outside view showing the top part of the cigar lighter shown in FIGS. 1 to 3.

FIG. 5 is a perspective view, looking generally downwards, showing a modification of the cigar lighter shown in FIGS. 1 to 4.

DESCRIPTION OF PREFERRED EMBODIMENTS OF THE INVENTION

The embodiment now to be described with reference to FIGS. 1 to 4 is a particular version of the cigar lighter 1 in accordance with the present invention, which is in a particularly preferred form but which, as mentioned above, is not limiting.

Figure 1:
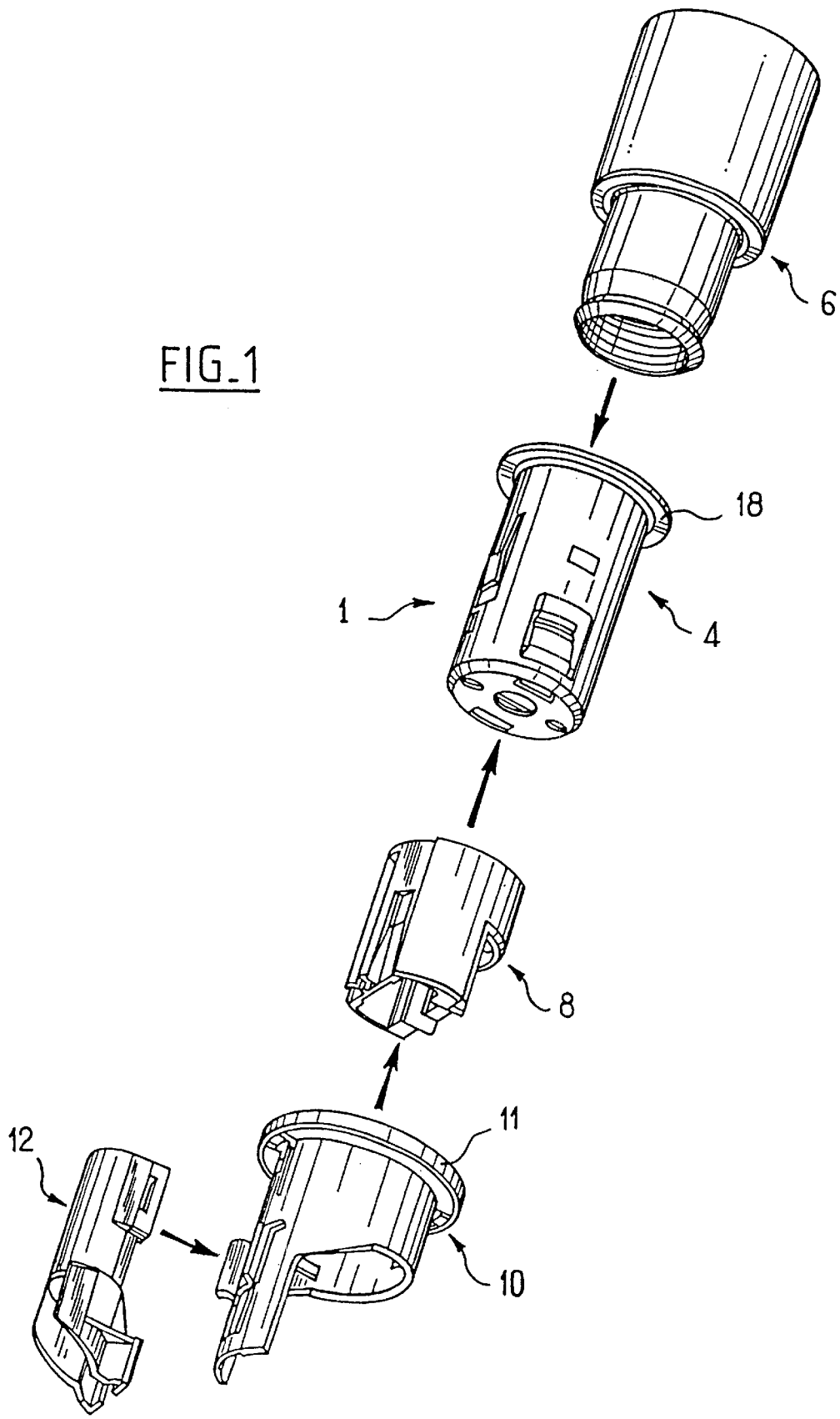
FIG. 1 is an exploded isometric view of a cigar lighter in accordance with the present invention.
Figure 2:
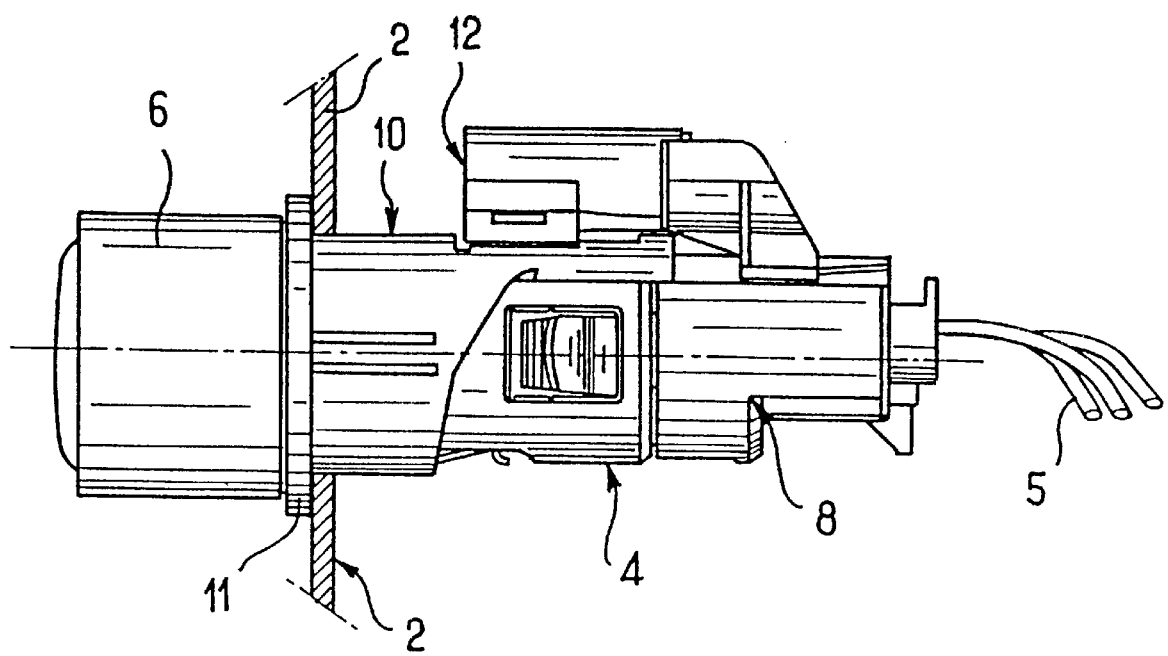
FIG. 2 is a side elevation of the heating plug of the cigar lighter shown in FIG. 1, which is here illustrated mounted on a fascia panel which is shown in cross section.

The cigar lighter 1 is arranged to be mounted in an opening in a fascia panel 2, FIG. 2, of a motor vehicle. It comprises a lighter body 4, a heating plug 6, a connecting module 8, an illuminating ring 10, and a lighting module 12, these components being seen separately in FIG. 1 and assembled together in FIG. 2.

The lighter body 4 is in the form of a can which serves as a receptacle for the plug 6 and which has an internal current supply element for electrically feeding a resistive heater which is spiral wound within the heater plug 6.

The connection module 8 is an axial extension of the lighter body 4 and is carried on the latter. The connection module 8 supplies electrical power to the lighter body 4 as can be seen in FIG. 2, through a bundle 5 of electric wires which connect the general electrical circuitry of the vehicle with the connecting module 8.

The illuminating ring 10 surrounds the lighter body 4 and secures the latter on the fascia panel 2. The ring 10 has a collar portion 11 which lights up so as to produce on the fascia panel a ring of light to mark the position of the cigar lighter 1 at night, see FIG. 2. The lighting module 12 is mounted on the illuminating ring 10, from which it protrudes as shown in FIG. 2.

U.S. Pat. No. 5,928,539 describes one embodiment for the lighter body, connection module, illuminating ring and lighting module, such as the body 4, module 8, ring 10 and module 12 described above and shown in FIGS. 1 and 2.

Reference is now made to FIGS. 3a and 3b. In these Figures, the heating plug 6 comprises a fixed part 14 and a moving part 16. The moving part 16 includes a hollow head piece 20 which contains the resistive heater, a push button 22 and various elements of electrically and thermally insulating materials which are interposed between the head piece 20 and the push button 22. A detailed description of one version of a moving part 16 for a heating plug is to be found in the above mentioned U.S. Pat. No. 5,928,539.

The fixed part 14 of the plug is in engagement on a flange 18 when the plug 6 is in position within the lighter body 4. The flange 18 is part of the lighter body 4 and it surrounds the entry aperture of the lighter body 4. The flange 18 is of metal.

The collar portion 11 is radial, extending at right angles to the longitudinal axis of the illuminating ring 10 and around the edge of the latter. The collar portion 11 is arranged to cooperate with the fascia panel 2 so as to secure the cigar lighter 1 on the fascia panel. The flange 18 only partly overlies the face of the collar portion 11 which, when the cigar lighter 1 is mounted on the fascia panel 2, faces towards a light guide 26 in such a way as to pass light from the illuminating ring 10 to the light guide 26. The flange 18 comprises a circular flat portion which extends radially around the said aperture and at right angles to the longitudinal axis of the lighter body 4.

When the push button 22 is pressed, the fixed part 14 of the heating plug being in abutment on the collar portion 11, the moving part 16 of the plug is displaced axially with respect to the fixed part 14 until the resistive heater comes into electrical contact with the current supply element in the lighter body. During this step, a helical return spring 24, which is interposed between the fixed part 14 and movable part 16 of the plug, is compressed as shown in FIG. 3b. The moving part 16 is retained in its pushed-in position by a two-fingered clip, or pinch clip, surrounding the head piece 20. When the resistive heater is hot enough, the clip expands out of contact with the head piece 20. The spring 24 then urges the head piece 20 to escape from the pinch clip.

The moving part 16 of the plug then returns to a position in which the user simply has to extract the heating plug 6 to light his cigarette or cigar. This position is shown in FIG. 3a.

Besides the light guide 26, the fixed part 14 of the heating plug includes a metal guide element 27 and a fire shield 28. The light guide 26 is mainly in the form of a cylinder. This is a cylinder of revolution about its axis O—O, which corresponds to the axis of straight line movement of the moving part 16 of the heating plug with respect to the fixed part 14 of the latter. The internal diameter of the cylinder constituting the light guide 26 is so chosen that it will guide the push button 22 in its axial sliding movement. The outer diameter of the light guide 20 increases slightly towards the end of the light guide furthest away from the fascia panel 2 when the heating plug 6 is in position in the lighter body 4. It may be noted that in the example shown, the length of the light guide is 26 mm.

The metal guide element 27, which is of metal, and the fire shield 28 also define cylinders of revolution about the axis O—O, the fire shield 28 being in the form of a sleeve.

The light guide 26 includes on its internal face fastening means 29 for fixing the metallic guide 27 and fire shield 28 on the light guide 26. These fastening means 29 are so arranged that they do not interfere with the propagation of light in the light guide 26 such that it will penetrate through the end face of the cylinder constituting the light guide 26, which is oriented towards the fascia panel. This edge is referred to in the rest of this text as the transmission face 30.

The external face of the cylinder that constitutes the light guide 26 is a gripping surface 32 by means of which the user can take hold of the plug 6 to take it out of the lighter body 4. Abutment means 31 are provided on the inner face of the metallic guide 27 to arrest the push button 22 at the end of its travel when it is pressed in by the user.

Like the illuminating sleeve 10, the light guide 26 is made of a transparent or translucent plastics material which is an electrical insulator and which is mouldable and colored. The colors of the plastics material of the light guide 26 and collar portion 11 are different. The light emitted is therefore colored differently according to whether or not the heating plug 6 is in position in the lighter body.

When the plug 6 is in position on the ligher body 4, the transmission face 30 and the face of the collar portion 11 which is mainly at right angles to the axis O—O and which faces towards the user, are very close to each other. They are spaced apart by at least 1 mm. The light generated by the lighting module 12 and propagated in the illuminating sleeve 10 is transmitted through the transmission face 30 to the whole of the light guide 26, as indicated in FIG. 4. The light guide 26 therefore emits light mainly through its cylindrical outer surface.

Numerous other versions may be envisaged, apart from the embodiments described above. Thus for example, the cylinder of the light guide 26 is preferably between 2.5 and 26 mm long. A light guide 26 a few millimeters in length forms only one ring of light, which may appear on part of the gripping surface 32.

Many other forms of light guide can be envisaged. In some versions of a cigar lighter according to the invention, another light guide is provided which is arranged to transmit light, received from the light guide 26, from the fixed part 14 to the push button 22, for example in order to light up on the latter a symbol, such as one which shows a lighted cigarette. In still further versions of cigar lighter according to the invention, the light is transmitted not through the collar portion 11 but by a source such as a light bulb, a light-emitting diode, a light guide such as a fibre optic, and the like, situated on the fascia panel 2, or the lighter body 4 or in any other suitable location, and adapted to transmit the light to the light guide 26 when the heating plug 6 is in position in the lighter body. The light may also be transmitted to the light guide 26 through the flanks of the latter, where an auxiliary lighting module 12 is provided on the outside of the cigar lighter 1.

In still further versions of cigar lighter according to the invention, the plastics material of the light guide 26 is uncoloured.

In the version shown in FIG. 5, to which reference is now made, the light guide 26 is flush with the surface of the fascia panel 2, while the light source is situated behind the latter. The light guide 26 forms a ring of light around the push button 22, which itself follows the curvature of the fascia panel 2. In this embodiment, the light guide 26 gives a luminous effect similar to luminous collar portions of cigar lighters of the kind described in U.S. Pat. No. 5,928,539 mentioned above. However, in the present case the light guide is fixed to the heating plug 6 and not to the lighter body 4.

What is claimed is:

1. A luminous cigar lighter comprising a lighter body, constituting a receptacle, and a luminous heating plug fitted removably in said receptacle, the heating plug including a light guide for propagating light transmitted to it when the heating plug is in position in the lighter body, and when said light is received from a light source external to the heating plug, wherein the lighter body has an aperture for introduction of the heating plug into the lighter body, and wherein the lighter body includes an illuminating sleeve surrounding the aperture for transmitting light to the heating plug when the heating plug is in the lighter body.

2. A luminous cigar lighter comprising a lighter body, constituting a receptacle, and a luminous heating plug fitted removably in said receptacle, the plug comprising a fixed part and a moving part, said moving part being carried by the fixed part and displaceable axially with respect to and within the fixed part, the moving part including a push button, the heating plug further including a light guide for propagating light transmitted to it when the heating plug is in position in the lighter body, and when said light is received from a light source external to the heating plug, wherein the fixed part includes the light guide, with the light guide surrounding the push button, wherein the lighter body has an aperture for introduction of the heating plug into the lighter body, and wherein the lighter body includes an illuminating sleeve surrounding the aperture for transmitting light to the heating plug when the heating plug is in the lighter body.

3. A cigar lighter according to claim 1, defining a n axis for said relative movement between the moving and fixed parts to take place along the axis, the light guide defining a cylinder of revolution about the axis, the cylinder having an internal diameter adapted for guiding sliding movement of the push button within the fixed part.

4. A cigar lighter according to claim 2 in combination with a motor vehicle having a fascia panel, wherein the lighter body is mounted on the fascia panel, and wherein the illuminating sleeve is visible on the fascia panel for marking the position of the cigar lighter.

5. A cigar lighter according to claim 3, wherein the illuminating sleeve is so positioned as to transmit light to the light guide.

6. A cigar lighter according to claim 5, wherein the illuminating sleeve has at least one luminous zone of a first color and the light guide has at least one luminous zone of a second color, whereby, when the heating plug is in position in the receptacle, the cigar lighter emits light of said second color, and when the plug is absent from the receptacle, the lighter emits light of said color.

7. A cigar lighter according to claim 3, wherein the light guide is flush with the surface of the fascia panel.

8. A cigar lighter according to claim 1, wherein the heating plug has a gripping surface, the light guide being at least partly coincident with the gripping surface.

9. A cigar lighter according to claim 8, wherein the light guide constitutes at least part of the gripping surface.

10. A cigar lighter according to claim 2, wherein the light guide is made of translucent plastics material.

11. A cigar lighter according to claim 2 in combination with an auxiliary lighting module external to the cigar lighter, the light guide defining flanks of the light guide, wherein the light guide is adapted to transmit light from the said auxiliary module through its said flanks.

12. A cigar lighter according to claim 1 in combination with a said light source, wherein the light source is selected from the group consisting of light guides, diodes and light bulbs.

13. The cigar lighter of claim 2, wherein the light guide is colored whereby to color the light transmitted thereby.

14. A luminous cigar lighter in combination with a motor vehicle having a fascia panel, the cigar lighter comprising a lighter body, constituting a receptacle, and a luminuous heating plug fitted removeably in said receptacle, the lighter body having an aperture for introduction of the heating plug into the lighter body, and the plug comprising a fixed part and a moving part, said moving part being carried by the fixed part and displaceable axially with respect to and within the fixed part, the moving part including a push button, the heating plug further including a light guide for propagating light transmitted to it when the heating plug is in position in the lighter body, and when said light is received from a light source external to the heating plug, wherein the fixed part includes the light guide, with the light guide surrounding the push button, and wherein the lighter body is mounted on the fascia panel and includes an illuminating sleeve visible on the fascia panel and surrounding the aperture, for marking the position of the cigar lighter and for transmitting light to the heating plug when the heating plug is in the lighter body, and wherein the illuminating sleeve is so positioned as to transmit light to the light guide.

15. A cigar lighter according to claim 14, defining an axis for said relative movement between said moving and fixed parts to take place along the axis, the light guide defining a cylinder of revolution about the axis, the cylinder having an internal diameter adapted for guiding sliding movement of the push button within the fixed part.

16. A cigar lighter according to claim 14, wherein the illuminating sleeve has at least one luminous zone of a first color and the light guide has at least one luminous zone of a second color, whereby, when the heating plug is in position in the receptacle, the cigar lighter emits light of said second color, and when the plug is absent from the receptacle, the lighter emits light of said first color.

17. A cigar lighter according to claim 14, wherein the light guide is colored whereby to color the light transmitted thereby.

18. A cigar lighter according to claim 14, wherein the light guide is flush with the surface of the fascia panel.

19. A cigar lighter according to claim 14, wherein the heating plug has a gripping surface, the light guide being at least partly coincident with the gripping surface.

20. A cigar lighter according to claim 18, wherein the light guide constitutes at least part of the gripping surface.

21. A cigar lighter according to claim 14, wherein the light guide is made of translucent plastics material.

22. A cigar lighter according to claim 14 in combination with an auxiliary lighting module external to the cigar lighter, the light guide defining flanks of the light guide, wherein the light guide is adapted to transmit light from the auxiliary module through its said flanks.

23. A cigar lighter according to claim 14 in combination with a light source, wherein the light source is selected from the group consisting of light guide, diodes and light bulbs.

24. A luminous cigar lighter comprising a lighter body, constituting a receptacle, and a luminous heating plug fitted removably in said receptacle, the plug comprising a fixed part and a moving part, said moving part being carried by the fixed part and displaceable axially with respect to and within the fixed part, the moving part including a push button, the heating plug further including a light guide for propagating light transmitted to it when the heating plug is in position in the lighter body, and when said light is received from a light source external to the heating plug, wherein the fixed part includes the light guide, with the light guide surrounding the push button;

wherein the lighter body has an aperture for introduction of the heating plug into the lighter body, wherein the lighter body includes an illuminating sleeve surrounding the aperture, for making the position of the cigar lighter and for transmitting light to the heating plug when the heating plug is in the lighter body;

wherein the illuminating sleeve is so positioned as to transmit light to the light guide.

* * * * *

UNITED STATES PATENT AND TRADEMARK OFFICE
CERTIFICATE OF CORRECTION

PATENT NO.    : 6,538,236 B1                                              Page 1 of 1
DATED         : March 25, 2003
INVENTOR(S)   : Phillippe Rostan It is certified that error appears in the above-identified patent and that said Letters Patent is hereby corrected as shown below:

Column 5,
Lines 43 and 66, delete "1", and insert therefore -- 2 --.
Line 43, delete "a n", and insert therefore -- an --.
Lines 54 and 64, delete "3", and insert therefore -- 4 --.
Line 63, after "said", insert -- first --.

Column 6,
Line 10, delete "1", and insert therefore -- 2 --.

Signed and Sealed this

Twenty-ninth Day of July, 2003

JAMES E. ROGAN
*Director of the United States Patent and Trademark Office*